No. 763,928. PATENTED JUNE 28, 1904.
J. R. REED.
DAMPER REGULATOR FOR STOVES.
APPLICATION FILED OCT. 16, 1903.
NO MODEL.

Witnesses.

Inventor
Jesse R. Reed,
By
James L. Norris
Atty.

No. 763,928. Patented June 28, 1904.

UNITED STATES PATENT OFFICE.

JESSE R. REED, OF BAIRD, TEXAS.

DAMPER-REGULATOR FOR STOVES.

SPECIFICATION forming part of Letters Patent No. 763,928, dated June 28, 1904.

Application filed October 16, 1903. Serial No. 177,344. (No model.)

*To all whom it may concern:*

Be it known that I, JESSE R. REED, a citizen of the United States, residing at Baird, in the county of Callahan and State of Texas, have invented new and useful Improvements in Damper-Regulators for Stoves, of which the following is a specification.

This invention relates to damper-regulators for stoves, and is more particularly designed for use in connection with the dampers of cook-stoves, ranges, and the like, and has for its object to provide a simple device adapted to be readily applied to any cook-stove of ordinary and well-known construction and by means of which the damper may be held in any desired adjusted position.

In stoves and ranges as ordinarily constructed the damper controlling the passage of the heat about the oven can be moved in one of two positions—that is to say, it can be turned into a position to admit the heat to pass by the oven or into another position so as to cause the heat to encircle the oven. Oftentimes it is desirable to turn the damper to an intermediate position, so as to cause a portion of the heat to exert its caloric effect upon the oven and permit the undesirable excess to escape through the stovepipe. By means of the attachment hereinafter described I am enabled to fasten the damper in any position to which it may be adjusted, as will hereinafter be made apparent, reference being had to the accompanying drawings, forming a part of this specification, and as particularly pointed out in the claims following the description.

Figure 1:
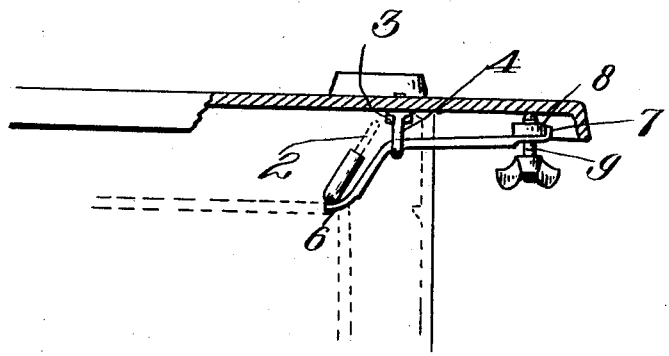
Figure 2:
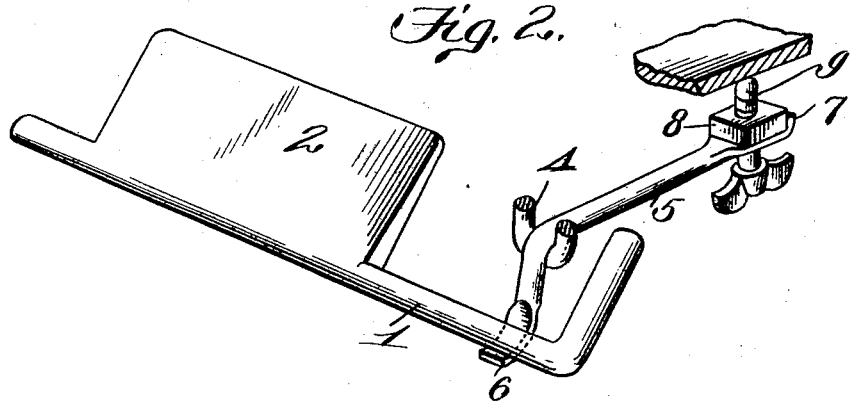

Figure 1 is a view in elevation of a portion of a stove, showing an improved attachment applied thereto. Fig. 2 is a detail perspective view of the attachment.

Referring to the drawings, the numeral 1 indicates the shank or stem upon which the damper 2 is fixed, said shank of the damper being of ordinary and well-known construction. Attached to the projecting side of the stove-top by means of a bolt 3 is a loop or stirrup 4, which forms a fulcrum for a lever 5. The lever 5 adjacent to its fulcrum is bent downwardly and at its extremity is bent upward to form a clasp 6, which is adapted to partially embrace the stem or shank 1 of the damper. The other end of the lever 5 is flattened and is provided at its extremity with an upturned flange 7, the flattened portion of said lever and its upturned flange forming a seat for a nut 8. Said flattened portion of the lever is perforated for the passage therethrough of a screw 9, provided upon its lower end with a "butterfly" or other suitable handle to enable the screw to be conveniently turned. As stated, the screw passes loosely through the lever 5 and engages the nut 8, seated upon the end of the lever, and the end of the said screw is arranged to bear against the under side of a fixed support—such, for example, as is shown in the drawings, the projecting edge of the stove-top.

In practice if the screw 9 be loosened the damper may be turned to its opened and closed position in the ordinary manner. Should, however, it be desired to turn the damper to a position intermediate its closed and opened position and hold it in such adjusted position, it is only necessary to turn the screw 9 in the proper direction, whereupon the lever 5 will be turned upon its fulcrum so as to cause its end 6 to frictionally engage the shank or stem of the damper with sufficient force to prevent the damper from accidentally turning.

It will be obvious that instead of applying the attachment to the under side of a stove-top it may be applied to a stovepipe or flue, and I do not wish to be understood as limiting myself to the exact arrangement herein shown.

Having described my invention, what I claim is—

1. In a stove-damper, the combination with a stirrup constructed for attachment to a stove, of a lever loosely fulcrumed intermediate its ends in said stirrup and provided at one end with means for frictionally engaging the shank of the damper, and means carried by the other end of said lever for throwing the latter into frictional engagement with the shank of the stove-damper, substantially as shown and described.

2. In a stove-damper, the combination with a stirrup constructed for attachment to a stove, of a lever loosely fulcrumed intermediate its ends in said stirrup and provided at one end with means for frictionally engaging the shank of the damper, a nut carried by the other end of the damper, and a screw engaging said nut and arranged to engage a stationary fixed part of the stove for throwing the lever into frictional engagement with the shank of the stove-damper, substantially as shown and described.

3. In a stove-damper, the combination with a stirrup constructed for attachment to a stove, of a lever loosely fulcrumed intermediate its ends in said stirrup and bent at one end to frictionally engage the shank of the damper, a nut carried by the other end of the lever, and a screw engaging said nut and arranged to bear against a stationary fixed part of the stove for throwing the lever into frictional engagement with the shank of the damper, substantially as described.

4. In a device of the character described, the combination of a stove-damper and its shaft, of a lever fulcrumed intermediate its ends and arranged to frictionally engage at one end the shaft of the damper and at its other end bent at a right angle to form a flange, a threaded bolt passing through said flanged end of the lever, and a nut on the bolt arranged to engage the said flange, said flange operating to prevent the nut from turning, substantially as described.

In testimony whereof I have hereunto set my hand in presence of two subscribing witnesses.

JESSE R. REED.

Witnesses:
L. L. BLACKBURN,
A. G. WEBB.